July 26, 1966  R. MOWATT-LARSSEN ETAL  3,262,402
COLLAPSIBLE HITCH

Filed Dec. 30, 1964  7 Sheets-Sheet 1

INVENTORS.
ROLF MOWATT-LARSSEN
ADAM D. SWEDA
BY Eugene N. Riddle
ATTORNEY

July 26, 1966  R. MOWATT-LARSSEN ETAL  3,262,402
COLLAPSIBLE HITCH
Filed Dec. 30, 1964
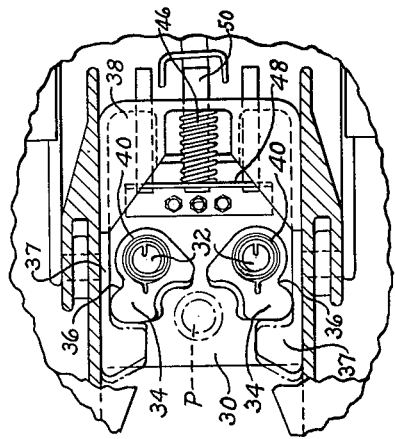
FIG. 6A
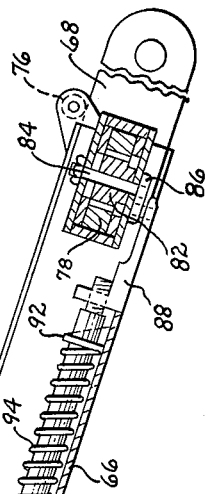
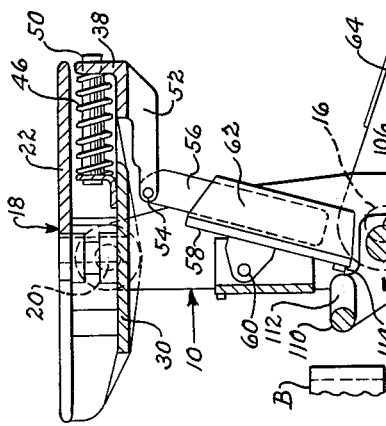
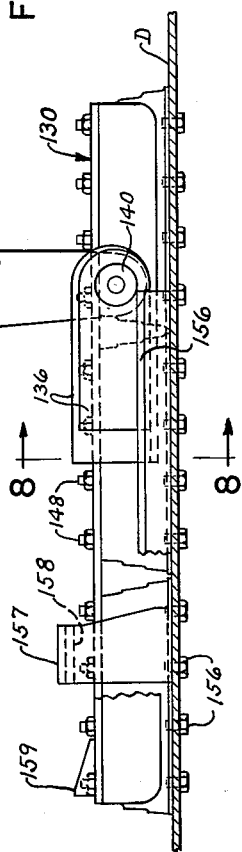
FIG. 2.

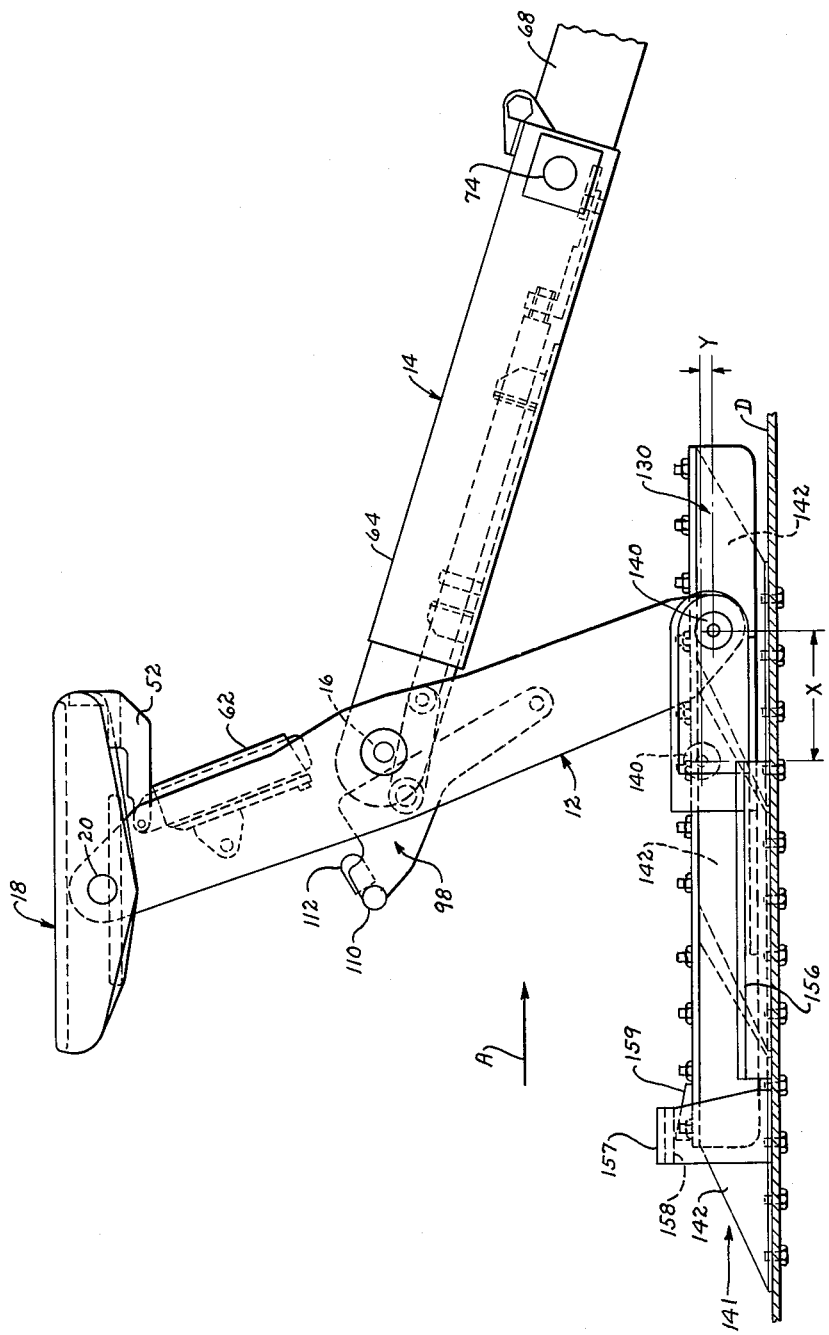

July 26, 1966 R. MOWATT-LARSSEN ETAL 3,262,402
COLLAPSIBLE HITCH
Filed Dec. 30, 1964 7 Sheets-Sheet 4

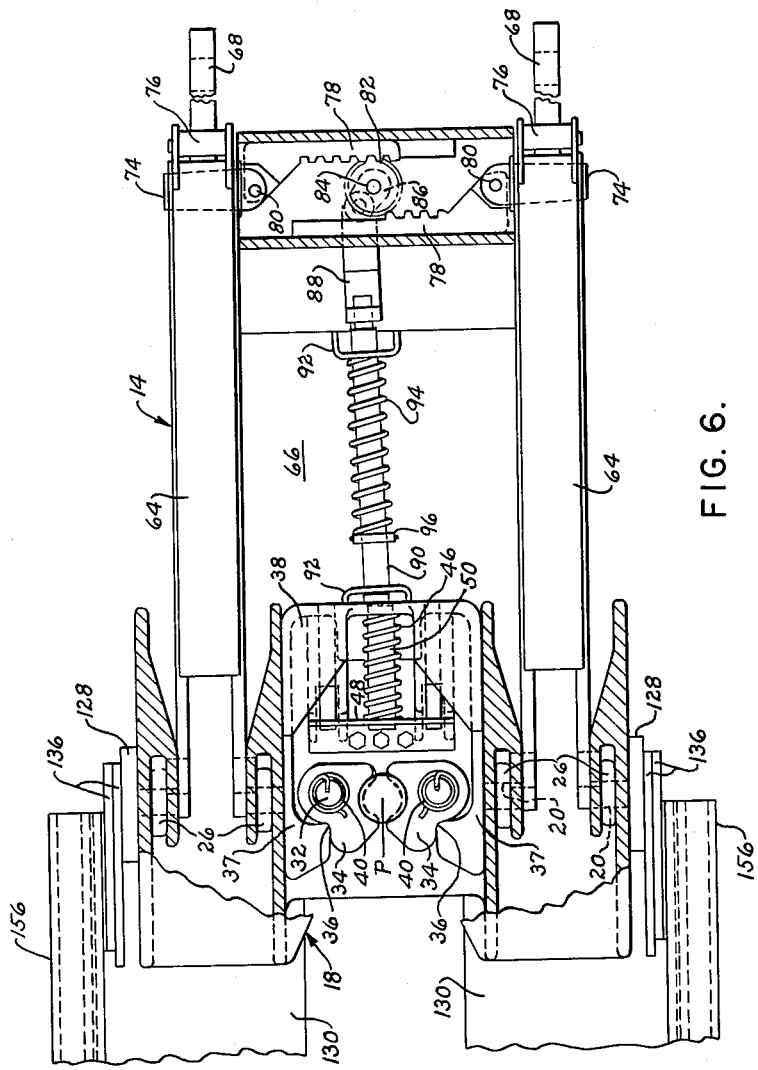

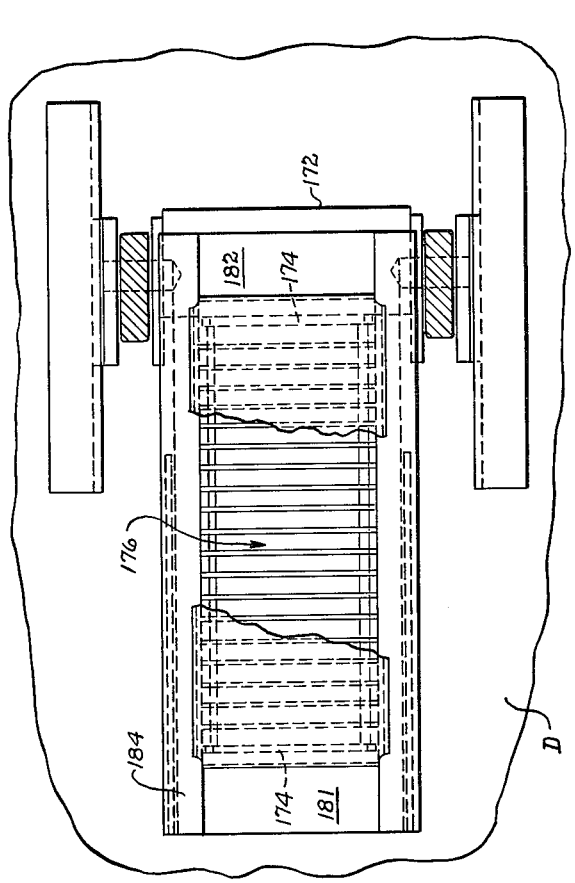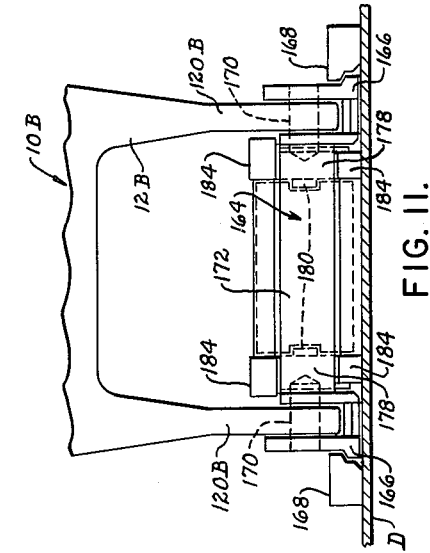

United States Patent Office 3,262,402
Patented July 26, 1966

3,262,402
COLLAPSIBLE HITCH
Rolf Mowatt-Larssen, Bridgeton, and Adam D. Sweda, Florissant, Mo., assignors to ACF Industries, Incorporated, New York, N.Y., a corporation of New Jersey
Filed Dec. 30, 1964, Ser. No. 422,216
15 Claims. (Cl. 105—368)

This invention relates to a collapsible hitch and more particularly to a collapsible hitch adapted to be mounted on a railway flat car and movable between a collapsed position and an erect position for securing the kingpin of a trailer or the like.

Heretofore, collapsible hitches which have been tractor actuated have normally had cushioning means positioned adjacent the lower end of a diagonal support. The prior cushioning means has normally extended rearwardly from the lower pivoted end of the diagonal support beneath the trailer or the like secured by the hitch. As some trailers have dolly wheels or landing gear connected by an axle, the prior cushioning units in some instances must be inset below the floor of the car or the dolly wheel must be raised in order to provide clearance for the dolly wheel axles.

The present invention provides cushioning means adjacent the lower end of the standard or vertical support of the hitch with the vertical support acting as a lever about a fulcrum at the connection of the diagonal support to the vertical support when the railway car is subjected to buff and draft forces. As the cushioning means is located between the lower end of the vertical support and the deck of the railway car, the vertical loads obtained from the dead load weight of the trailer and the thrust of the trailer when subjected to impact loads are employed to increase the effectiveness of the cushioning means. The cushioning unit may also be positioned on the floor or deck of the railway car without interfering in any manner with the trailer or dolly wheel axles.

One embodiment of the invention includes the mounting of a resilient shear block between the lower end of the vertical support and the railway car with a vertical compression load exerted on the shear block from the weight of the trailer and the hitch. The compression load supplements or aids the cushioning action and also provides a vertical cushioning for the trailer as well as a lateral cushioning transversely of the railway car. Thus, an improved cushioning is obtained in the employment of a resilient shear block since both a vertical cushioning and a lateral cushioning are provided in addition to the longitudinal cushioning. With the use of such a resilient shear block, a travel of around nine (9) inches in each longitudinal direction may be obtained to provide adequate cushioning, the vertical compression load increasing the stiffness of the resilient shear block to provide increased resistance to movement and thereby an increased cushioning.

Another embodiment of the present invention employs a sliding shoe between the lower end of the vertical support and the floor of the car with the shoe being cushioned against buffer discs which are compressed to absorb the impact forces. The weight and thrust of the trailer in this instance is utilized to provide increased sliding friction between the sliding shoe and its fixed support on the car to provide increased resistance to movement of the vertical support and thereby supplement the cushioning action of the buffer discs.

It is an object of the present invention to provide a cushioned trailer hitch adapted for mounting on a railway flat car to secure the kingpin of a trailer or the like.

A further object of this invention is to provide such a cushioned trailer hitch which utilizes the vertical forces obtained from weight and thrust of the trailer to supplement or aid the cushioning action against the horizontal forces exerted by the trailer.

An additional object is the provision of a cushioning unit for a collapsible trailer hitch which provides both a vertical cushioning and a longitudinal horizontal cushioning.

Another object is the provision of a cushioned collapsible hitch which may be positioned adjacent the end of a low level flat car having a draft gear housing projecting above the deck or floor of the car.

The invention accordingly comprises the constructions hereinafter described, the scope of the invention being indicated in the following claims.

In the accompanying drawings, in which several various possible embodiments of the invention are illustrated, FIGURE 1 is a fragmentary side elevational view of a trailer secured to a railway flat car by the trailer hitch comprising one embodiment of the present invention with a tractor shown for actuating the hitch;

FIGURE 2 is a side elevational view of the hitch shown in FIGURE 1 with certain parts broken away and illustrating the locked position of the kingpin and the locked position of the hitch when erect;

FIGURE 3 is a side elevational view of the hitch of FIGURES 1 and 2 showing the hitch in erect position after it has moved in a cushioning action under impact forces exerted against the railway car;

FIGURE 6 is a top plan view of the hitch in erect position with certain parts broken away to illustrate the locked position of the kingpin and the locked position of the diagonal support;

FIGURE 6A is a top plan view of the fifth wheel plate structure shown in FIGURE 6 with certain parts broken away to show the kingpin locking means in unlocked position;

FIGURE 11 is a partial front elevational view of a further embodiment of this invention in which the vertical support is mounted on a sliding shoe for cushioned back and forth movement along the floor plate of the railway car upon impact forces being exerted against the railway car;

FIGURE 12 is a side elevational view of the embodiment shown in FIGURE 11;

FIGURE 13 is a top plan view of the embodiment of the cushioning means shown in FIGURES 11 and 12 showing the normal erect position of the vertical support; and FIGURE 14 is a top plan view similar to FIGURE 13 but showing the position of the cushioning means and vertical support after the vertical support has moved in a cushioning action from impact forces exerted against the railway car.

Figure 1:
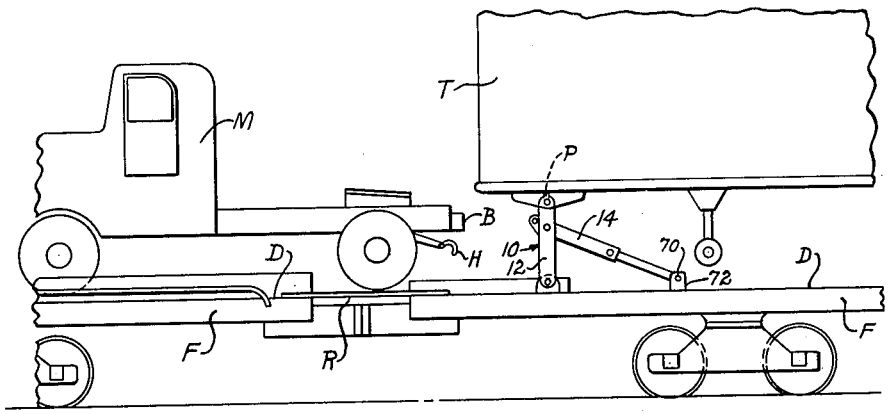

Corresponding reference characters indicate corresponding parts throughout the several views of the drawings.

Referring to the drawings, and particularly to FIGURE 1, railway flat cars F are coupled to each other and their floor or deck plates D are spanned by bridge plates R. A tractor M is supported on bridge plates R when moving from one flat car to another and is adapted to transport a trailer T partially shown in FIGURE 1. A collapsible trailer hitch or support indicated generally at 10 is mounted on flat car F and engages a kingpin P extending from the front end of trailer T which is locked in position to hold the associated trailer in secured position. While hitch 10 is illustrated in the drawings as mounted on a railway flat car, it is to be understood that the hitch may be mounted on other transporting means, such as, for example, barges, or the like.

Referring particularly to FIGURES 2–6, hitch 10 comprises a vertical support generally designated 12 and a diagonal support generally designated 14 pivotally connected about a horizontal pivot 16 to vertical support 12. A fifth wheel or supporting plate is generally designated 18 and is pivotally connected at 20 about a horizontal pivot to the extending end of vertical support 12. Hitch 10 is adapted to be pulled from a collapsed position to an erect position by a hook H on the rear of tractor M upon forward movement of the tractor. A bumper block B attached to the rear of tractor M is adapted to knock hitch 10 to a collapsed position from erect position upon rearward movement of the tractor and thereby effect unlocking of trailer kingpin P and unlocking of diagonal support 14 permitting collapsing of hitch 10 as will be explained more fully. In some instances, the cross frame member on the rear of tractor M may be employed to knock hitch 10 to collapsed position without the use of a separate bumper block B.

Figure 4:
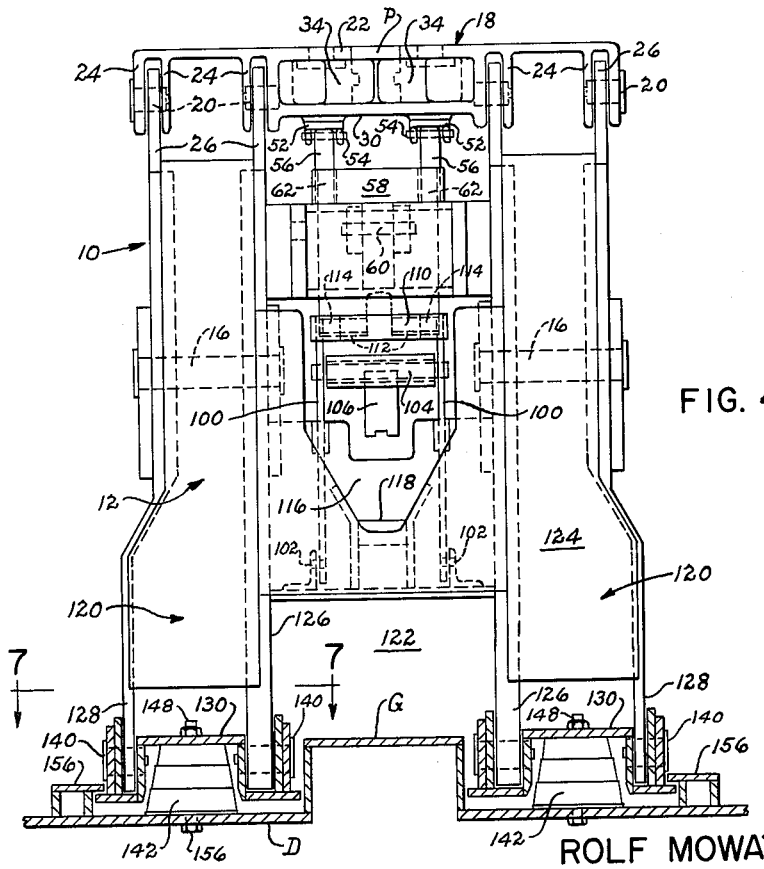
FIGURE 4 is a front elevational view of the hitch shown in FIGURES 2 and 3 illustrating the hitch in an erect position.
Figure 5:
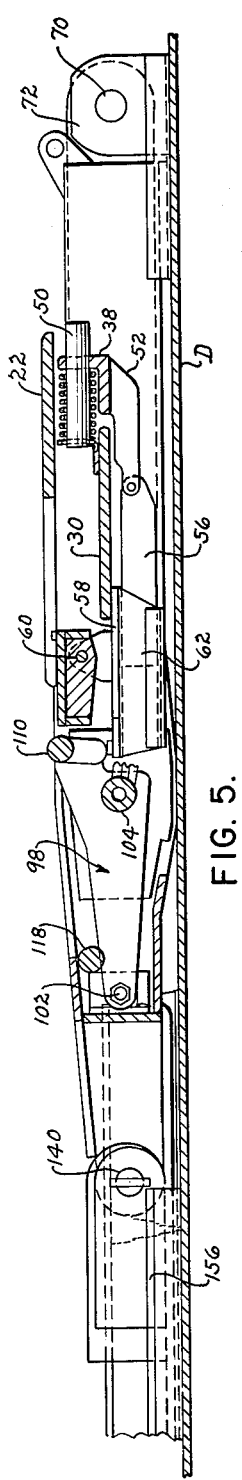
FIGURE 5 is a side elevational view of the hitch of FIGURES 2–4 illustrating the hitch in a collapsed position with certain parts broken away.

Fifth wheel plate 18 comprises an upper plate 22 having ribs 24 which receive fingers 26 of vertical support 12. Fingers 26 are pivotally connected to ribs 24 to form pivots 20 and mount fifth wheel plate 18 for pivotal movement relative to vertical support 12. A lower plate 30 forms a pocket with upper palte 22 as shown in FIGURE 4. Mounted on lower plate 30 for rotation on pins 32 are locking jaws 34 adapted to engage and secure kingpin P. Each jaw 34 has a notch 36 adapted to be engaged in locked position by extending arms 37 of a yoke 38. A torsion spring 40 urges each jaw 34 to unlocked position and prevents inadvertent swinging of the jaws to a closed position before kingpin P contacts and swings the jaws to closed position. A spring 46 is compressed between yoke 38 and a bracket or stop 48 secured to lower plate 30 to bias yoke 38 in a rearward direction. Spring 46 telescopes a rod 50 secured to bracket 48.

To actuate yoke 38 and referring to FIGURES 2 and 4, two arms 52 are secured to the underside of yoke 38. Pivotally mounted to each arm 52 at 54 is a link 56. A pivot plate 58 is pivotally mounted at 60 to vertical support 12. An open ended box-shaped extension 62 on each side of pivot plate 58 receives an associated link 56 in telescoping relation as shown in FIGURE 2 to permit free slippage between links 56 and extensions 62.

Diagonal support 14 comprises a pair of upper box-shaped diagonal legs 64 connected by a bottom plate 66 as shown in FIGURES 2 and 6. Telescoped within each box-shaped leg 64 is a separate lower leg 68 of a generally rectangular cross-sectional area. Each leg 68 is pivotally mounted at 70 to a lug 72 fixed to deck plate D. To hold legs 64 and 68 in proper aligned position when the hitch is erected, registered openings are formed in legs 64 and 68. Locking pins 74 are inserted through the registering openings in legs 64, 68 to lock diagonal support 14 in the erect position of the hitch. To decrease frictional contact between legs 64, 68 when the hitch is moved between collapsed and erect positions, a roller 76 is carried by each leg 64 for riding along the adjacent top surface of the associated telescoping leg 68.

Locking means to move pins 74 in locking position include racks 78 pivotally connected at 80 to pins 74. A pinion 82 on shaft 84 engages racks 78 and a suitable housing encloses pinion 82 and racks 78. A lever or arm 86 is fixed to the lower end of shaft 84 and a link 88 is pivotally connected to arm 86. A rod 90 is mounted for longitudinal movement within suitable openings on projections 92 secured to bottom plate 66. A spring 94 around rod 90 is compressed between a stop 96 secured to rod 90 and rearward projection 92 to bias rod 90 and pinion 82 in a direction to urge pins 74 outwardly in locked position with legs 64 and 68.

For moving rod 90 and pinion 82 in a direction for unlocking legs 64 and 68 to permit collapsing of hitch 10, a push lever or actuating member generally indicated 98 has legs 100 pivoted at 102 on vertical support 12 as shown in FIGURES 2 and 4. Extending between legs 100 is a horizontal cross member 104 having a link 106 pivoted at 108 to rod 90. Projecting forwardly of vertical support is a push bar 110 extending between legs 100 and urged outwardly by the bias of spring 94 and rod 90 against lever 98. Lugs 112 on push bar 110 are adapted to bear against complementary lugs 114 on the lower end of pivot plate 58. Spring 46 urges pivot plate 58 and lugs 114 into engagement with lugs 112.

To unlock legs 64 and 68 for permitting collapsing of hitch 10 and to unlock kingpin P, bumper block B on the rear of tractor M engages push bar 110 upon rearward movement to move rod 90 and rotate pinion 82 for pulling pins 74 from the openings within telescoping legs 64 and 68. Substantially simultaneously therewith, lugs 112 pivot plate 58 to move yoke 38 forwardly permitting jaws 34 to swing to open position upon the collapsing of hitch 10 thereby releasing kingpin P. For further details of telescoping legs 64 and 68, reference is made to copending application Serial No. 324,461 filed November 18, 1963 and entitled "Collapsible Support," the entire disclosure of which is incorporated by this reference.

Referring to FIGURE 4, the front face of vertical support 12 has an open pocket 116 in which lever 98 is positioned and a pull-up bar 118 is secured along the lower edge defining pocket 116 so that a hook H may engage bar 118 for erecting the hitch as shown in FIGURE 2.

An important feature of the present invention is the provision of a cushioning means between the lower end of vertical support 12 and floor D of the car to permit the vertical support to swing in a lever action about pivot 16 when the railway car is subjected to impact forces, such as indicated in FIGURE 3.

Flat cars of the so-called low level type have draft gear housings projecting above the upper surface of the floor plate and the hitch must straddle the draft gear housing if positioned closely adjacent the end of the flat car. Referring to FIGURES 2, 3, 7 and 8 in which one embodiment of the cushioning at the lower end of vertical support 12 forming the invention is illustrated, vertical support 12 comprises a pair of legs 120 forming a pocket 122 therebetween permitting vertical support 12 to straddle a draft gear housing G projecting above deck plate D of the car. A front plate 124 extends between legs 120. Forming each leg 120 are respective inner and outer leg portions 126, 128 which are flared outwardly adjacent their lower ends to receive therebetween a generally channel-shaped shoe 130. Shoe 130 comprises an upper cover plate 132 and downwardly extending flanges 134. Carried by each flange 134 are supporting plates 136 connected to flange 134 by a connecting plate 138. Pins 140 mount legs 126, 128 between flanges 134 and plates 136 for relative pivotal movement. Upon collapsing of hitch 10, the portions of shoes 130 rearwardly of pivot 140 are received between leg portions 126, 128 of the adjacent legs 120.

Figure 8:
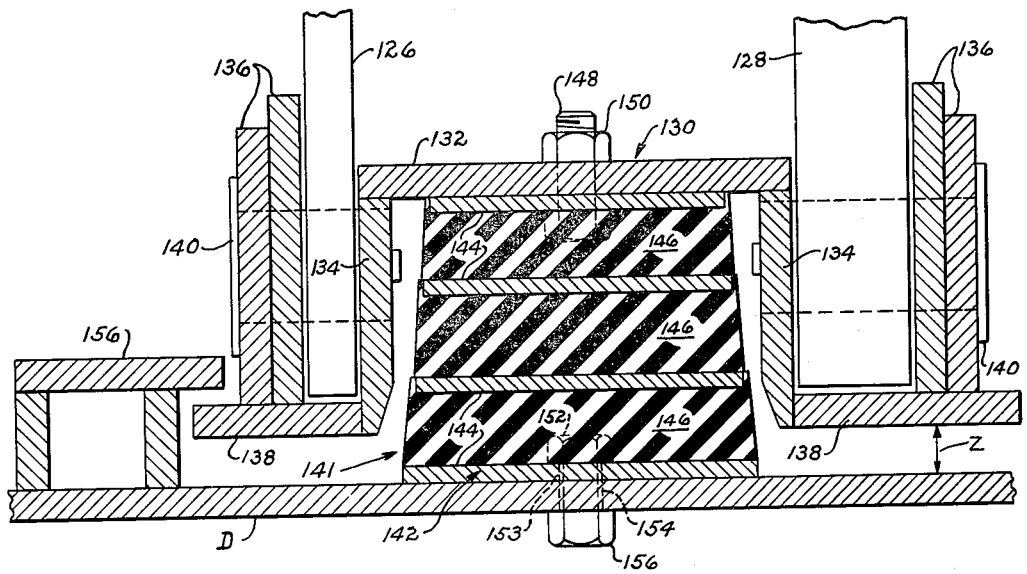
FIGURE 8 is a sectional view taken generally along line 8—8 of FIGURE 2 and showing the mounting of the vertical support on the cushioning unit of the present invention.

A cushioning unit designated generally 141 is interposed between each leg 120 and the floor of railway car 10 as shown in FIGURE 8. Cushioning unit 141 is of the type to absorb impact forces from a shearing action and comprises a plurality of shear pads 142, each having a plurality of horizontal plates 144 separated by resilient blocks 146, such as, for example, rubber. If it is desired to limit the longitudinal travel of shoe 130 physical stops or abutments (not shown) may be secured to the floor plate D adjacent each end of shoe 130. The cushioning resulting from the shear action of unit 141 may be predetermined by the number of shear pads 142 employed with an increased cushioning resulting from an increased number of shear pads. For illustration, three shear pads 142 are shown on each shoe 130.

Figure 7:
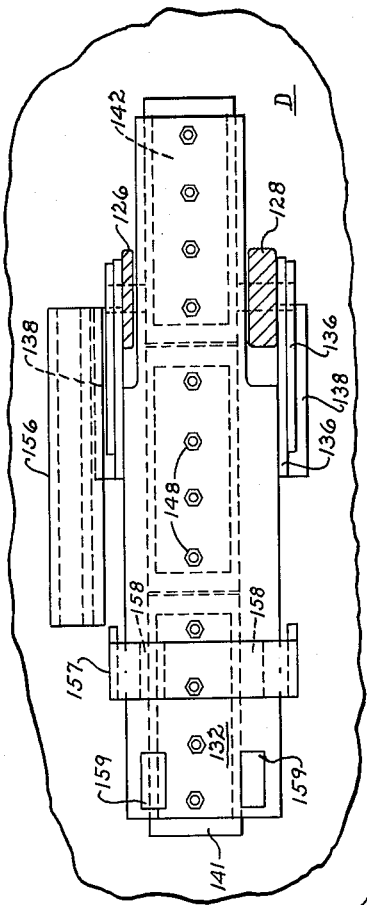
FIGURE 7 is a sectional view taken generally along line 7—7 of FIGURE 4 and showing the cushioning unit to which the vertical support is connected for cushioning the hitch.

Studs 148 are formed with each pad 142 and have threaded ends projecting above upper plate 144 through suitable openings in cover plate 132. Suitable nuts 150 secure shoe 130 and yoke arms 126, 128 to pads 142. Lower plate 144 has a plurality of internally threaded nuts 152 secured thereto and registering with suitable openings 153. Openings 154 in floor plate D register with openings 153 in plate 144 and suitable threaded studs 156 extend through the aligned openings 153, 154 to engage nuts 152 for securing pads 142 to floor D. As shown in FIGURES 4 and 8, a guide 156 overlaps connecting plate 138 and is welded to floor plate D adjacent each outer plate 138 to limit lateral and upward movements of vertical support 12 upon impact forces exerted against railway car 10. Shoe 130 extends for the entire length of cushioning unit 141 as shown in FIGURE 7 while plates 136 extend only for a portion for the length of pads 142.

Referring to FIGURE 3, the position of hitch 10 is illustrated after it has been subjected to impact forces and has moved longitudinally of the car a distance X of around eight or nine inches with fifth wheel plate 18 remaining in a substantially horizontal position. When impact forces are directed against the car from a direction indicated by arrow A in FIGURE 3, a compressive force or load is exerted on vertical leg 12 and shear pads 142 from the forward thrust of trailer T and kingpin P. The compressive loading of shear pads 142 results in an increase of the stiffness of rubber block 146 thereby to provide an increased cushioning action.

A specific example of a preformed molded rubber shear pad which has been found to be satisfactory is sold under the trade name "Lord" by Lord Manufacturing Company, Erie, Pa., and has a length of around 15 inches, a height of around 4 inches, and a width of around 5½ inches. Three shear pads 142 may be provided on each side of vertical support 12 as shown in FIGURES 3 and 4. With such shear pads, when a vertical compression load of around 20,000 pounds is applied through kingpin P, rubber pads 142 are compressed around about ⅛ inch. When a relatively large impact force, such as obtained by speeds of around 10 miles per hour, is exerted, the lower end of vertical support 12 and shoe 130 move a distance of around 8 inches as illustrated in FIGURE 3. An additional compressive force from the trailer is exerted on shear pads 142 to compress shear pads 142 a distance Y between ¼ and ½ inches. Referring to FIGURE 8, connecting plates 138 are spaced from floor plate D a distance Z of around ¾ inch in the normal erect position of hitch 10 when not supporting a trailer T thereby to provide sufficient clearance for the compressive action of vertical support 12. Thus, the compressive action of trailer T increases the cushioning action of shear pads 142.

When the rear portion of shoe 130 moves downwardly under the compressive forces exerted by trailer T, there is a tendency for the opposite front portion of shoe 130 to move upwardly particularly under a relatively long travel of shoe 130, such as five inches and over. To assist guide 156 in holding shoe 130 down, a channel-shaped band 157 extends over cover plate 132 and has its ends secured to floor D on opposite sides of each shoe 130. Cam blocks 158 are secured to the underside of band 157 over cover plate 132 and are offset from studs 148 as shown in FIGURES 2, 3 and 7. Secured to cover plate 132 forwardly of band 157 are inclined coacting cam blocks 159 adapted to engage longitudinally aligned cam blocks 158 upon movement of shoe 130 a distance, for example, of around five (5) inches. Guide 156 is positioned on only one side of shoe 130 and does not prevent canting of vertical support 12 and shoe 130. However, since blocks 158 and 159 are provided adjacent each side of studs 148, the canting of shoe 130 will be corrected upon contact of blocks 159 with blocks 158.

Since pivot 70 at the lower end of diagonal support 14 remains fixed, vertical leg 12 pivots about pivot 16 in a lever action when hitch 10 is subjected to impact forces. Shear pads 142 return vertical support 12 and trailer T to their original position after the cushioned movement shown in FIGURE 3.

Operation is as follows:

Upon rearward movement of tractor M, pusher bar 110 and lever 98 are pushed inwardly upon contact with bumper block B. Movement of lever 98 moves rod 90 and pivots lever 86 to pull pins 74 from aligned openings in diagonal legs 64, 68 thereby to permit hitch 10 to be collapsed. Substantially simultaneously therewith, pivot plate 58 is pivoted to move arms 52 and yoke 38 to a position releasing jaws 34. In this position, kingpin P will be released upon the downward collapsing of hitch 10. Further rearward movement of tractor M causes bumper block B to engage and push vertical support 12 downwardly.

For raising the hitch from collapsed position, hook H engages pull bar 118 and the tractor is driven forwardly to raise vertical support 12. When the openings in diagonal legs 64, 68 are aligned, locking pins 74 are positioned therein under the bias of spring 94 to lock the hitch in erect position. After the hitch is erected, the trailer is lowered to supporting relation of fifth wheel plate 18 with kingpin P slightly forward of jaws 34. The tractor M is then moved rearward to permit manual release of hook H. Then after forward movement of the tractor, the trailer T is pushed rearwardly by the tractor fifth wheel to move kingpin P against jaws 34 to swing the jaws to closed position with spring 46 biasing yoke 38 to closed locked position with jaws 34.

Figure 10:
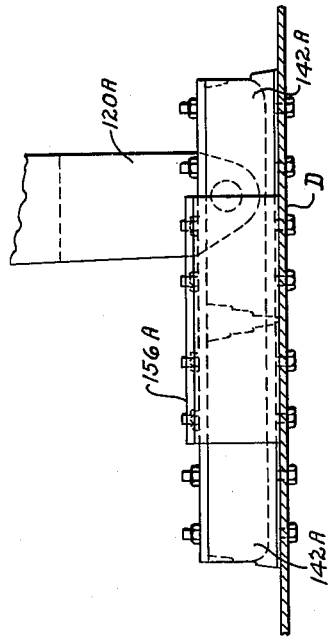
FIGURE 10 is a side elevational view of the cushioning means shown in FIGURE 9.
Figure 9:
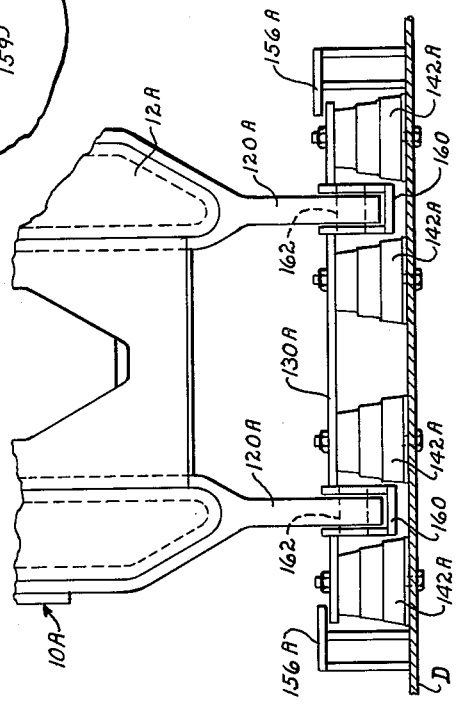
FIGURE 9 is a partial front elevational view of another embodiment of the hitch illustrating cushioning means having a resilient block on each side of each bifurcated leg portion of the vertical support positioned between the vertical support and the deck plate of the railway car.

Referring to FIGURES 9 and 10, an embodiment of the hitch is illustrated in which shear pads 142A, identical to shear pads 142 of the embodiment of FIGURES 1–8, are positioned on each side of the lower end of each leg 120A of vertical support 12A. Hitch 10A is not adapted to straddle a draft gear housing projecting from floor D. A cover plate 130A is secured to shear pads 142A and has an upwardly opening slot adjacent each side thereof defined by a downwardly extending channel-shaped portion 160 extending the length of plate 130A. Legs 120A are pivotally connected at 162 to channel-shaped portions 160. To limit upward and lateral movements of hitch 10A, a guide 156A is secured to floor D adjacent each side of cover plate 130A and overlap cover plate 130A. Shear pads 142A provide the only connection between vertical support 12A and deck plate D of the railway car. The functioning and operation of hitch 10A is similar to that of hitch 10 shown in FIGURES 1–8.

Referring to FIGURES 11–14, a further embodiment of this invention is illustrated in which hitch 10B has a vertical support 12B with the lower end of each leg 120B supported on a slide generally designated 164. Slide 164 is supported on floor D and slides back and forth in a cushioned movement upon impact forces being exerted against the railway car with a resulting leverage exerted by the lower end of vertical support 12B. The weight and thrust of the trailer when subjected to buff and draft forces exerts a compressive vertical load on slide 164 which increases the sliding friction between slide 164 and floor D thereby to aid the cushioning action.

A rabbeted slide block 166 on each side of slide 164 is fixed thereto by pivot pins 170 and moves back and forth along rabbeted guide rails 168 secured to floor D. Slide block 166 has end cross members 171, 172 forming moveable abutments for follower plates or blocks 174 of a cushioning unit generally designated 176. Cushioning unit 176 comprises a plurality of rubber buffer disks separated by metal plates. Longitudinal members 178 of slide 164 have keys 180 for holding cushioning unit 176 in position. To retain slide 164, a housing is fixed to floor D and includes end cross members 181, 182 forming fixed abutments or stops for follower blocks 174. Longitudinal members 184 of the fixed housing fit about slide 164 as illustrated in FIGURE 11.

Figure 14:
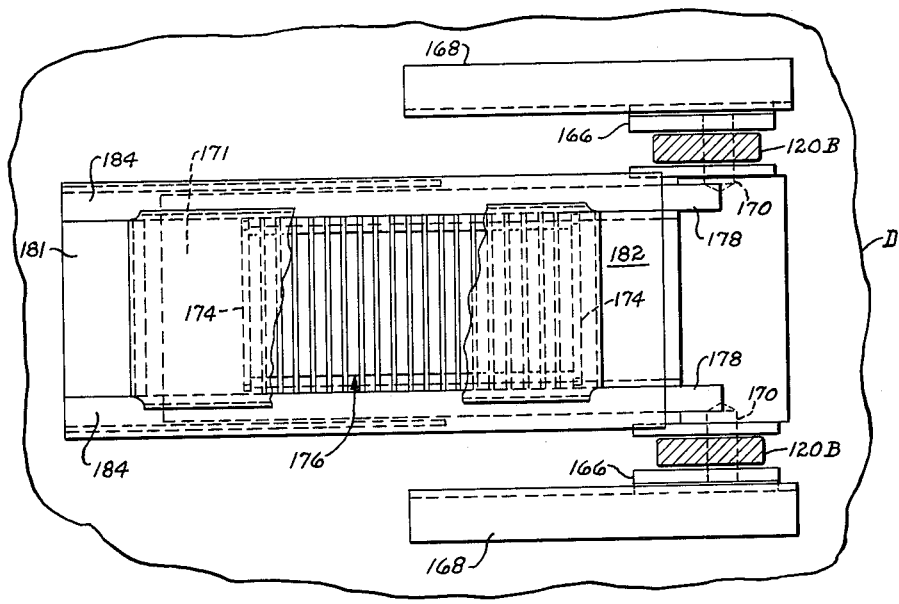

FIGURE 13 illustrates the position of slide 172 in the normal rest position of hitch 10B while FIGURE 14 illustrates the position of slide 164 after impact forces have been exerted against the railway car from one direction. As shown in FIGURE 14, moveable abutment 171 of slide 164 carries follower block 174 to compress cushioning unit 176 while fixed abutment 182 acts as a stop for the adjacent follower block 174. Slide blocks 166 move along guide rails 168 in the cushioned movement.

When impact forces are exerted from an opposite direction, fixed abutment 181 will act as a stop for the adjacent follower block 174 while movable cross member or abutment 172 will compress unit 176 by engaging the adjacent follower block 174. Hitch 10B functions in a manner similar to that of hitch 10 shown in FIGURES 1–8. It is to be understood that other types of cushioning units may be employed, if desired, such as a hydraulic cushioning unit.

From the foregoing, it is apparent that the compressive load exerted from the kingpin supplements or aids the cushioning action to provide improved cushioning. By positioning the cushioning means adjacent the lower pivoted end of the vertical support with the vertical support acting as a lever, there is no interference with dolly wheel axles carried by some trailers and thus, adequate clearance is provided.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A hitch adapted to releasably secure the kingpin of a trailer or the like on a railway car, comprising: a supporting base, a generally vertical support extending upwardly from the base, means connected to the supporting base mounting said support for pivotal movement about a horizontal axis at a position intermediate the upper and lower ends of the support, a fifth wheel plate pivotally connected adjacent the upper end of said vertical support for releasably securing the kingpin, said vertical support being pivoted about its pivotal connection to said mounting means in a lever action upon the exertion of a longitudinal force from the kingpin to swing the lower end of the support in one generally horizontal direction relative to the supporting base and to swing the upper end and fifth wheel plate in an opposite generally horizontal direction, and cushion means between the supporting base and said lower end of said vertical support to cushion the pivotal movement of the support about its horizontal axis and to return the support to its original position after a generally horizontal cushioned movement of the lower end of the vertical support.

2. A hitch as set forth in claim 1 wherein the means mounting said support for pivotal movement about a horizontal axis comprises a diagonal support pivotally connected adjacent its upper end to said generally vertical support and pivotally connected adjacent its lower end to the supporting base.

3. A collapsible hitch adapted to releasably secure the kingpin of a trailer or the like on a railway car, comprising, a supporting base, a generally vertical support pivotally connected adjacent its lower end about a generally horizontal axis for movement between a generally vertical erect position and a generally horizontal collapsed position, a diagonal support pivotally connected adjacent one end to the vertical support at a position intermediate the length of the vertical support and pivotally connected adjacent its other end about a generally horizontal axis supported on the supporting base, a fifth wheel plate pivotally connected adjacent the upper end of said vertical support, said vertical support being pivoted about its pivotal connection to the diagonal support in a lever action upon the exertion of a longitudinal force from the kingpin to swing said lower pivotal axis in one generally horizontal direction relative to the supporting base and to swing the fifth wheel plate in an opposite generally horizonal direction, and means mounted on the supporting base and operatively connected to said lower pivotal axis of said vertical support for cushioning the lower end of said vertical support upon pivotal movement of the vertical support about its connection to the diagonal support and for returning the vertical support to its original erect position after a generally horizontal cushioned movement of the lower end of the vertical support.

4. A collapsible hitch as set forth in claim 3 wherein said means comprises a pair of relatively movable parts, one of said parts being secured to the supporting base and the other part being connected to the lower end of said vertical support for movement therewith.

5. A railway flat car having a collapsible hitch mounted thereon and adapted to secure the kingpin of a trailer or the like, said hitch movable between a collapsed inoperable position and a raised operable position and comprising, a generally vertical support in the raised position of the hitch mounted for pivotal movement adjacent its lower end about a generally horizontal axis and a diagonal support pivotally connected to the vertical support intermediate its ends on the side thereof adjacent the trailer, a fifth wheel plate carried on the upper end of said vertical support and including latch means adapted to cooperate with the kingpin of a trailer or the like to secure the front end of same, said diagonal support being mounted for pivotal movement adjacent its lower end about a generally horizontal axis fixed against movement longitudinally of the railway car in the raised operable position of the hitch, said vertical support upon the exertion of buff and draft forces from the railway car being pivoted about its pivotal connection to the diagonal support in a lever-like action to swing its lower pivotal axis in one generally horizontal direction relative to the railway car and to swing the fifth wheel plate in an opposite generally horizontal direction, and means mounted on the car operatively connected to said lower pivotal axis of the vertical support for cushioning the lower end of the vertical support upon the horizontal movement thereof relative to said car and simultaneous pivotal movement of the vertical support about its pivotal connection to the diagonal support when buff and draft forces are exerted on the railway car and for returning the lower end of the vertical support in a horizontal movement to its original generally vertical position after cushioned movement of the lower end of the vertical support.

6. A railway flat car having a collapsible hitch mounted thereon as set forth in claim 5 wherein said means comprises a resilient shear pad positioned between the car and the lower end of the vertical support, one surface of the shear pad being secured to the car and an opposite surface being secured to the lower end of the vertical support.

7. A railway flat car having a collapsible hitch mounted thereon and adapted to secure the kingpin of a trailer or the like, said hitch comprising a vertical support movable between a generally vertical erect position and a generally horizontal collapsed position, a diagonal support pivotally connected adjacent one end to the vertical support at a position intermediate the length of the vertical support and pivotally connected adjacent its other end about a generally horizontal axis fixed against movement longitudinally of the railway car in the erect position of the vertical support, a fifth wheel support plate pivotally connected adjacent the upper end of the vertical support and including jaws adapted to engage and secure the kingpin of a trailer or the like, a resilient shear block having one surface secured to the car and an opposite surface secured to the lower end of said vertical support about a pivotal connection, said vertical support upon the exertion of forces from the kingpin being pivoted about its pivotal connection to the diagonal support in a lever action to swing the fifth wheel plate in one generally horizontal direction and to swing the lower end of the vertical support in an opposite generally horizontal direction, said opposite surface of said shear block and the lower end of said vertical support moving relative to said one secured surface thereby to cushion the movement of the lower end of the vertical support in a shearing action of the shear block, said opposite surface returning to its original position after the movement of the vertical support has been cushioned and thereby returning the vertical support to its original vertical position.

8. A railway flat car as set forth in claim 7 wherein a plate-like member contacts substantially the entire opposite surface of said shear block and is secured thereto for movement, the lower end of said vertical support being pivotally connected to said plate-like member for movement therewith.

9. A collapsible type hitch mounted on a support base and adapted to engage the kingpin of a trailer or the like comprising, a generally vertical support mounted for pivotal swinging movement about a generally horizontal axis on the base between a generally vertical raised position and a generally horizontal collapsed position, a fifth wheel plate carried by the extending end of the vertical support and including latch means to engage and secure the kingpin of a trailer or the like, a diagonal support pivotally connected adjacent one end to said vertical support intermediate the ends thereof and pivotally connected adjacent its opposite end about a horizontal axis fixed to the base in the raised position of the vertical support, the diagonal support comprising a pair of telescoping arms movable between an extended raised position and a retracted collapsed position and having openings aligned with each other in the extended position thereof, a locking pin carried by said diagonal support and adapted to be inserted within the aligned openings for releasably locking the telescoping arms in extended position, means to bias the locking pin into locking position, means to remove the locking pin from the aligned openings to permit movement of the hitch to a collapsed position, said vertical support upon the exertion of buff and draft forces from the kingpin pivoting about its pivotal connection to the diagonal support in a lever-like action to swing said lower pivotal axis in one generally horizontal direction relative to the base and to swing the fifth wheel plate in an opposite generally horizontal direction, and cushioning means mounted on the base and operatively connected to the lower pivotal axis of the vertical support for cushioning its lower end upon the horizontal movement thereof relative to said base and the simultaneous lever-like action of the vertical support about its connection to the diagonal support, the cushioning means returning the fifth wheel plate and the vertical support to their original positions after cushioned movement of the lower end of the vertical support and remaining connected to the lower end of said vertical support when the vertical support is in collapsed position and during movement thereof between raised and collapsed positions.

10. A railway car having a collapsible hitch mounted thereon and adapted to secure the kingpin of a trailer or the like, said hitch comprising a generally vertical support movable about a pivotal horizontal axis between a generally vertical erect position and a generally horizontal collapsed position, a diagonal support pivotally connected adjacent one end to the vertical support at a position intermediate the length of the vertical support and pivotally connected adjacent its other end about a generally horizontal axis fixed in an erect position of the hitch, a fifth wheel plate pivotally connected adjacent the upper end of the vertical support and having an opening therein adapted to receive the kingpin, latch means carried by said fifth wheel plate adapted to engage the kingpin for securing same when the hitch is in erect position, said diagonal support being movable between an extended position and a retracted position, means for releasably locking the diagonal support in an extended position, an actuating member projecting from the side of the vertical support opposite the diagonal support and operatively connected to both the locking means for the diagonal support and the latch means for the kingpin, the actuating member upon inner movement thereof effecting disengagement of the kingpin and unlocking of the diagonal support whereby the hitch is moved to a collapsed position, said vertical support upon the exertion of buff and draft forces from the kingpin being pivoted about its pivotal connection to the diagonal support in a lever-like action to swing said lower pivotal axis in one generally horizontal direction and to swing the fifth wheel plate in an opposite generally horizontal direction, and cushioning means mounted on the railway car operatively connected to the lower pivotal axis of said vertical support for cushioning its lower end upon horizontal movement thereof relative to said car and simultaneous pivotal movement of the vertical support about its pivotal connection to the diagonal support, the cushioning means having a portion thereof secured to the railway car and returning the vertical support to its original vertical position after cushioned movement of the lower end of the vertical support and remaining connected to the lower end of said vertical support when the vertical support is in collapsed position and during movement thereof between erect and collapsed positions.

11. A railway flat car having a collapsible hitch mounted thereon and adapted to secure the kingpin of a trailer or the like supported on the flat car, said hitch comprising a generally vertical support movable between a generally vertical erect position and a generally horizontal collapsed position, a diagonal support pivotally connected adjacent an upper end to the vertical support at a position intermediate the length of the vertical support and pivotally connected adjacent its other lower end about a generally horizontal axis substantially fixed in the erect position of the hitch, a fifth wheel support plate pivotally connected adjacent the upper end of the vertical support and including jaws adapted to engage and secure the kingpin of a trailer or the like, and a resilient shear block between the lower end of the vertical support and the railway car and solely supporting the vertical support, said shear block having a generally rigid load transmitting member secured to the upper surface thereof and having a lower opposite surface secured to the car, said load transmitting member secured to the lower end of said vertical support for transmitting forces from the vertical support to the shear block, said vertical support adapted to pivot about its pivotal connection to the diagonal support in a lever action to swing the fifth wheel plate in one generally horizontal direction and to swing the lower end of the vertical support in an opposite generally horizontal direction, the load transmitting member and the lower end of said vertical support moving longitudinally of the car with the vertical support being supported on the load transmitting member during such movement, the load transmitting member and the vertical support returning to their original position after the cushioned movement of the vertical support.

12. A collapsible hitch adapted to secure the kingpin of a trailer or the like supported on a flat car, said hitch comprising a generally vertical support movable between a generally vertical erect position and a generally horizontal collapsed position, a diagonal support pivotally connected adjacent an upper end to the vertical support at a position intermediate the length of the vertical support and pivotally connected adjacent its other lower end about a generally horizontal axis substantially fixed in the erect position of the hitch, a fifth wheel plate pivotally connected adjacent the upper end of the vertical support and including jaws adapted to engage and secure the kingpin of a trailer or the like, a resilient shear block solely supporting the vertical support and having a compressive force exerted thereupon by the vertical support, and a generally rigid load transmitting member secured to the upper surface of the shear block and secured to the lower end of said vertical support for transmitting forces from the vertical support to the shear block, said vertical support adapted to pivot in a cushioned movement about its pivotal connection to the diagonal support in a lever action to swing the fifth wheel plate in one generally horizontal direction and to swing the lower end of the vertical support member in an opposite generally horizontal direction, the pivotal movement of the vertical support exerting a shearing action against the shear block through the load transmitting member whereby the movement of the vertical support is cushioned by the shear block.

13. A collapsible hitch as set forth in claim 12 wherein means are provided to limit the upward movement of the shear block upon cushioned movement of the lower end of said vertical support.

14. A collapsible hitch as set forth in claim 13 wherein means are provided to limit canting of said vertical support in a direction transversely of the car upon cushioned movement of the lower end of said vertical support.

15. A railway flat car having a collapsible hitch mounted thereon and adapted to secure the kingpin of a trailer or the like, said hitch movable between a collapsed inoperable position and a raised operable position and comprising, a generally vertical support in the raised position of the hitch and a diagonal support pivotally connected to the vertical support intermediate its ends on the side thereof adjacent the trailer, a fifth wheel plate carried on the upper end of said vertical support and including latch means adapted to cooperate with the kingpin of a trailer or the like to secure the front end of same, said vertical and diagonal supports being mounted for pivotal movement adjacent their lower ends upon movement of the hitch between collapsed and raised positions, said vertical support upon the exertion of buff and draft forces from the railway car pivoting about its pivotal connection to the diagonal support in a lever-like action to swing its lower pivotal axis in one generally horizontal direction relative to the railway car and to swing the fifth wheel plate in an opposite generally horizontal direction, a slidable member positioned adjacent the lower end of the vertical support, means to permit sliding movement of the slidable member in a generally horizontal direction, the lower end of the vertical support being mounted on said slidable member for back and forth generally horizontal movement therewith relative to the railway car, and a cushioning unit operatively connected to said slidable member for cushioning the movement of the slidable member and the lower end of the vertical support upon the pivotal movement of the vertical support about its pivotal connection to the diagonal support when buff and draft forces are exerted on the railway car, the cushioning unit returning the vertical support to its original generally vertical position after cushioned movement of the lower end of the vertical support.

References Cited by the Examiner
UNITED STATES PATENTS

| | | | |
|---|---|---|---|
| 2,880,681 | 4/1959 | Markestein et al. | 105—368 |
| 3,041,028 | 6/1962 | McDowell | 248—119 |
| 3,142,466 | 7/1964 | Gutridge et al. | 248—119 |
| 3,164,346 | 1/1965 | Bateson | 248—119 |
| 3,167,288 | 1/1965 | Farabaugh | 105—368 X |
| 3,168,878 | 2/1965 | Clejan | 105—368 |

ARTHUR L. LA POINT, *Primary Examiner.*

D. E. HOFFMAN, *Assistant Examiner.*